United States Patent [19]

Takeda et al.

[11] Patent Number: 4,649,286
[45] Date of Patent: Mar. 10, 1987

[54] POWER SUPPLY CIRCUIT FOR VEHICLE

[75] Inventors: Nobuhiro Takeda; Masaichi Hattori, both of Aichi, Japan

[73] Assignee: Kabushiki Kaisha Tokai Rika Denki Seisakusho, Aichi, Japan

[21] Appl. No.: 635,230

[22] Filed: Jul. 27, 1984

[30] Foreign Application Priority Data

Jul. 29, 1983 [JP] Japan ................ 58-119267[U]

[51] Int. Cl.$^4$ ............................................. B60R 16/00
[52] U.S. Cl. .............................. 307/10 R; 307/10 BP; 361/170
[58] Field of Search ............ 307/10 R, 10 LS, 10 BP, 307/125, 130, 140; 361/160, 170, 187, 190, 194

[56] References Cited

U.S. PATENT DOCUMENTS

| | | | |
|---|---|---|---|
| 3,112,431 | 11/1963 | Pederson | 361/187 |
| 3,139,562 | 6/1964 | Freeborn | 361/187 |
| 3,436,608 | 4/1969 | Caulier et al. | 361/187 X |
| 4,123,668 | 10/1978 | Pecota | 307/10 LS |
| 4,516,034 | 5/1985 | Bier | 307/10 R |

FOREIGN PATENT DOCUMENTS 1222975  8/1966  Fed. Rep. of Germany ...... 361/190

Primary Examiner—A. D. Pellinen
Assistant Examiner—Derek S. Jennings
Attorney, Agent, or Firm—Finnegan, Henderson, Farabow, Garrett & Dunner

[57] ABSTRACT

A power supply circuit for a vehicle for providing power to motorized accessories, such as power windows and sun roofs, even after the vehicle ignition has been switched off. The power supply circuit includes a relay having relay contacts for delivering power to the accessory drive motor, and a relay coil which is energized upon switching on of the vehicle ignition. The relay is self-holding and continues to be energized even after the ignition has been switched off. However, when a door of the vehicle is opened, as detected by the closing of a door switch, the relay coil is de-energized and power to the accessory drive motor is terminated. In an alternative embodiment, power to the accessory drive motor is not terminated until after sequential opening and closing of a vehicle door.

18 Claims, 5 Drawing Figures

POWER SUPPLY CIRCUIT FOR VEHICLE

BACKGROUND OF THE INVENTION

The invention relates to the field of power supply circuits and, more particularly, to a power supply circuit for an automobile for use in connection with motor driven accessories, such as windows, a sun roof or the like.

With the advent of luxury automobiles, many accessories which were previously mechanically operated have now been provided with a motorized drive mechanism. For example, it is well known to equip an automobile with windows which are motor driven or with a sun roof likewise motorized.

The power needed to drive these motors is typically derived from the battery in the vehicle. In a typical installation, the accessory motor is connected to the ignition switch so as to be operative only when the vehicle is turned on. This avoids the potential of inadvertent discharge of the battery of an unattended vehicle and other safety-related problems. In such installations, a relay is provided which operates in response to the turning-on of the vehicle ignition switch to apply power from the battery to the drive motor of the accessory. Once the ignition is switched off, the relay is de-energized and the accessory can no longer be operated.

This arrangement creates an inconvenience, however, in the event the driver desires to operate the accessory after turning off the the ignition switch. For example, a driver may turn off the vehicle and only then notice that certain windows are left open. In prior art devices, however, the window cannot be closed via the accessory motor unless the ignition switch is again turned on. This step thus created an inconvenience to the driver.

Accordingly, a problem exists in such prior art devices in that power to the accessory motor was terminated with turning off of the ignition switch, whereas many occasions arise in which it is desirable to still have power available for such motors even after the ignition has been turned off.

SUMMARY OF THE INVENTION

It is therefore an object of the invention to enable the application of power to an accessory motor drive in a vehicle even after the vehicle's ignition switch has been turned off.

Another object of the invention is to continue the availability of such power only until a door of the vehicle has been opened, at which time power to the accessory motor is terminated.

A further object of the invention is to terminate the availability of power for the accessory motor drive following turning off of the vehicle ignition switch only after a vehicle door has been sequentially opened and then closed.

Additional objects and advantages of the present invention will be set forth in part in the description that follows and in part will be obvious from the description or may be learned by practice of the invention. The objects and advantages of the invention may be realized and obtained by the apparatus particularly pointed out in the appended claims.

To achieve the objects and in accordance with the purpose of the invention, as embodied and broadly described herein, a circuit is provided for a motorized vehicle having an ignition switch connected to a power source, such as a battery. The circuit controls the application of power from the power source to an electric device, such as a motor for driving an electric window or sun roof. The circuit includes a relay having relay contacts and a driving coil. The relay contacts are connected between the power source and the electric device to apply power to the device upon enerization of the driving coil. Door switch means are coupled to the power source for detecting opening of a door of the vehicle. Control means are coupled to the ignition switch, to the door switch means and to the driving coil, for energizing the driving coil in response to power being applied from the power source by the ignition switch, and for de-energizing the driving coil in response to the door switch means detecting opening of a door of the vehicle.

The accompanying drawings which are incorporated in and constitute a part of this specification, illustrate several embodiments and modifications of the principles of the invention.

DESCRIPTION OF THE PREFERRED EMBODIMENTS

Figure 1:
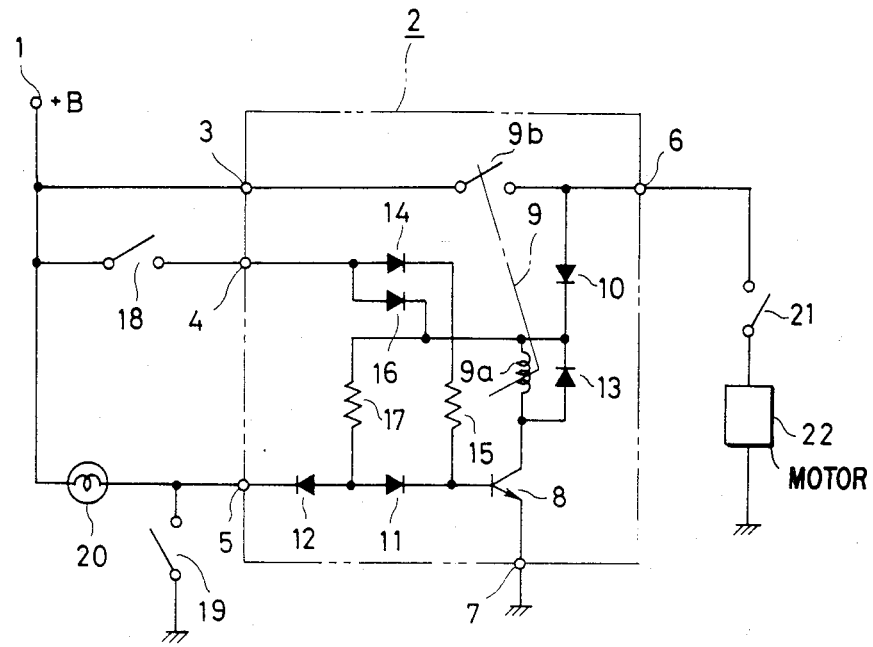
FIG. 1 is a schematic diagram illustrating a first embodiment of a power supply circuit for a vehicle in accordance with the present invention.

Reference will now be made in detail to the presently preferred embodiments of the invention, examples of which are illustrated in the accompanying drawings. Throughout the drawings, like reference characters are used to designate like elements.

Referring to FIG. 1, a first embodiment of the present invention is shown in which numeral 1 designates a positive (+B) terminal of a DC power supply of a vehicle, such as a battery whose negative terminal is grounded. Terminal 1 is connected to a power source input terminal 3 of a control means 2. Control means 2 comprises an ignition switch input terminal 4, a door switch input terminal 5, an output terminal 6, and an earth or ground terminal 7.

As here embodied, control means 2 includes an NPN transistor 8 and a relay 9 having a driving coil 9a and relay contacts 9b. The collector of transistor 8 is connected to output terminal 6 through a series connection comprising driving coil 9a of relay 9 and a diode 10 having a cathode connected to coil 9a and an anode connected to output terminal 6. The emitter of transistor 8 is connected to ground via terminal 7, and the base of transistor 8 is connected to the door switch input terminal 5 through a series connection of diodes 11 and 12, whose anodes are coupled together as shown. A surge absorbing diode 13 is connected in parallel across driving coil 9a.

Relay contacts 9b of relay 9 preferably are of the normally opened type and are connected between the power supply input terminal 3 and the output terminal 6. Upon closure of relay contacts 9b by energization of driving coil 9a, power delivered from the power supply at terminal 1 is available at output terminal 6.

The ignition switch input terminal 4 is connected to two circuit branches: a first one comprising a diode 14 having a cathode connected through a resistor 15 to the base of transistor 8; and a second one comprising a diode 16 having a cathode connected to the cathode of diode 13, to driving coil 9a and to a resistor 17. The other side of resistor 17 is connected to the common anodes of diodes 11 and 12.

Ignition switch input terminal 4 is connected to the positive power supply terminal 1 through an ignition switch 18. Preferably ignition switch 18 comprises a normally-opened type which is closed upon switching on of the vehicle ignition. Such ignition switches are well known in the art and need not be described further for purposes of the present invention. The door switch input terminal 5 of control means 2 is connected to a door switch 19 and to a lamp 20. Lamp 20 is serially connected between door switch input terminal 5 and power supply terminal 1, whereas switch 19 is connected from door switch input terminal 5 to ground. Door switch 19 is preferably a single pole, single throw switch arranged to be normally open when the door of the vehicle is closed, and vice versa. Thus, upon opening of the vehicle door, switch 19 is closed, thus shorting door switch input terminal 5 to ground.

Output terminal 6 of control means 2 is connected to ground through a series connection comprising a forward-reverse actuation switch 21 and a drive motor 22 suitable for driving an accessory device, such as power windows or a sun roof. Thus, once power has been made available at output terminal 6, drive motor 22 can be selectively controlled via switch 21 to produce the desired movement of the accessory device. Switches and drive motors suitable for these purposes are well known in the art.

It should be appreciated that although only one door switch 19 is shown in FIG. 1, this switch is merely representative of a plurality of switches which may perform similar on/off functions in connection with the opening/closing of respective doors at the driver's seat, the passenger's seat, and the rear seats of the vehicle. Likewise, while only one electric device comprising drive motor 22 and switch 21 is shown in FIG. 1, it is to be understood that output terminal 6 may be coupled to a plurality of such motors and switches corresponding, for example, to accessories used to drive the windows, a sun roof, an electric antenna, or the like.

Operation of the circuit of FIG. 1 will now be described. Upon turning ignition switch 18 on, the DC voltage of the battery is applied to the series connection of driving coil 9a and transistor 8 through ignition switch 18 and diode 16. Simultaneously a base current flows into transistor 8 through diode 14 and resistor 15, thus turning on transistor 8 so as to pass a current through the driving coil 9a. This energization of the driving coil actuates relay 9, closing relay contacts 9b to apply power to output terminal 6. Power to drive motor 22 is thus made available.

Upon closure of relay switches 9b, the DC supply voltage of the vehicle battery is also applied to the series connection of diode 10, driving coil 9a and the collector of transistor 8, whereas a base current flows into transistor 8 via series connected diode 10, resistor 17 and diode 11. Accordingly, transistor 8 is maintained in its on state such that relay 9 continues to be actuated regardless of the state of the ignition switch 18. This is known as a "self-holding" arrangement in that it enables power to continue to be applied at output terminal 6 regardless of the state of ignition switch 18. If forward/reverse actuation switch 21 is performed, drive motor 22 is correspondingly energized in the forward/reverse direction to cause the window glass or other accessory to move in the desired manner.

Moreover, even if the driver subsequently turns the ignition switch off, relay 9 is maintained in its self-holding state with relay contact 9b being closed. Accordingly, if the driver becomes aware that an accessory is in an undesirable position, such as the window glass still being open, drive motor 22 may still be energized to perform the desired movement. Thereafter, if the driver opens the door by the driver's seat, door switch 19 is switched on and lamp 20 is energized through the series connection to ground. Simultaneously, the anode of each of diodes 11 and 12 is dropped to zero potential, i.e., grounded, so that base current is prevented from flowing into transistor 8. The discontinuance of this base current turns off transistor 8, thereby de-energizing relay coil 9a so that relay 9 is released from its self-holding state and turns back to its initial state in which relay contacts 9b are open. This interupts the flow of power to output terminal 6, thus disabling drive motor 22.

If the driver then closes the door, such as after the driver has gotten out of the car, door switch 19 is opened so as to turn off lamp 20. Lamp 20 may comprise a lamp for the interior of the vehicle so as to provide convenient illumination for the vehicle occupants upon opening of the doors.

In the embodiment shown in FIG. 1, it is important to note that power will continue to be delivered to output terminal 6 regardless of opening or closing of the vehicle doors provided ignition switch 18 is still in its on state. Although opening a door will close switch 19, thereby grounding the anodes of diodes 11 and 12, in the case where ignition switch 18 is still closed, base current will continue to flow in a transistor 8 through diode 14 and resistor 15. Thus, transistor 8 will be maintained in its on state, regardless of the operation of switch 19, so that relay contacts 9b will continue to be closed.

The embodiment shown in FIG. 1 provides several advantages. First, the self-holding arrangement permits power to continue to be available at output terminal 6 even after ignition switch 18 has been turned off. This provides great convenience to a driver who, for example, notices that the vehicle's windows have been left open after the ignition switch has been turned off. Second, once the driver opens the door to get out of the vehicle, door switch 19 causes relay 9 to be de-energized, whereby DC power is no longer made available at output terminal 6. This has the advantage of preventing inadvertent discharge of the vehicle's battery and permits a high degree of safety to be associated with the vehicle's power accessories.

Figure 2:
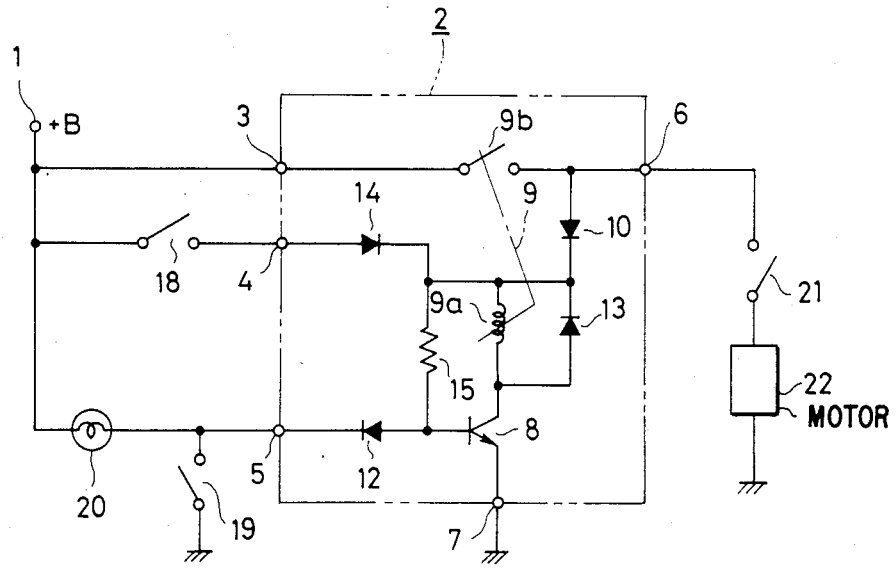
FIG. 2 is a schematic diagram illustrating a second embodiment of a power supply circuit for a vehicle in accordance with the present invention.

FIG. 2 shows a second embodiment of the present invention which differs from the first embodiment in that diodes 11 and 16 and resistor 17 have been omitted and, in their place, the cathode of diode 10 is connected to the cathode of diode 14 whereas the anode of diode 12 is connected to the base of transistor 8. According to this embodiment, even if ignition switch 18 is in its on state, the base of transistor 8 is grounded whenever door switch 19 is turned on, i.e., whenever a door is opened. This releases relay 9 from its self-holding state and opens relay contacts 9b. Accordingly, motor drive 22 is disabled whenever a door is in its open state, even if ignition switch 18 is still on.

Figure 3:
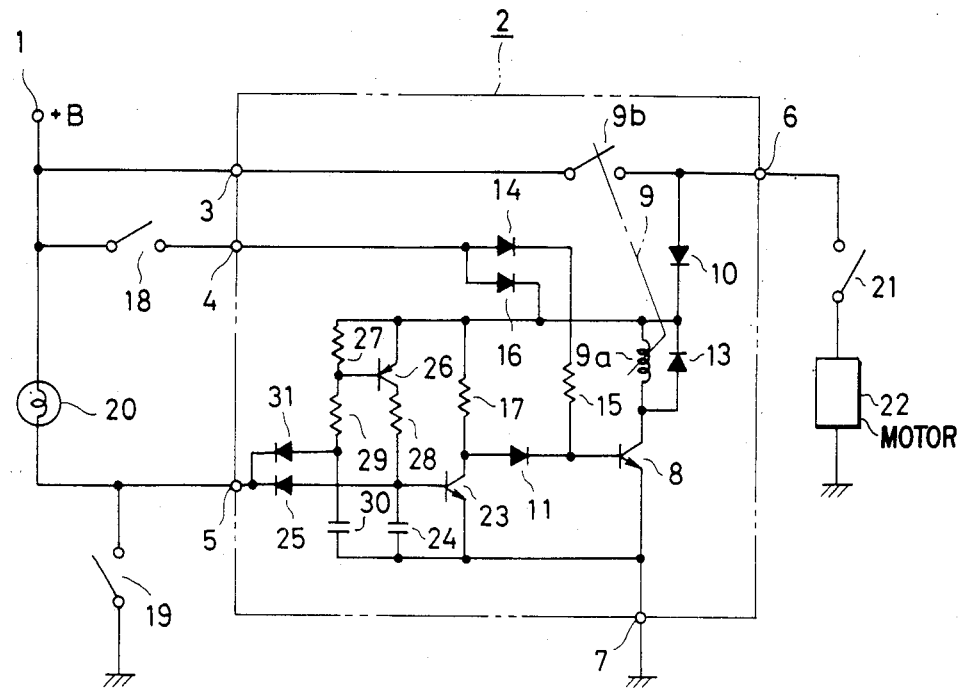
FIG. 3 is a schematic diagram illustrating a third embodiment of a power supply circuit for a vehicle in accordance with the present invention.

A third embodiment of the present invention is shown in FIG. 3. In this embodiment, an NPN transistor 23 has a collector connected to the anode of diode 11, and emitter connected to ground terminal 7, and a base connected to the ground 7 through a capacitor 24 as well as to the door switch input terminal 5 through a diode 25. Additionally, a PNP transistor 26 is utilized having an emitter connected to the cathode of diode 16, a collector connected to the base of transistor 23 through a resistor 28 and a base connected back to the emitter thereof, via a resistor 27. The base of transistor 26 is further connected to ground terminal 7 via a resistor 29 and a capacitor 30. The junction point between the resistor 29 and capacitor 30 is connected to the door switch input terminal 5 through a diode 31.

If ignition switch 18 is turned on while door switch 19 is in its off state, namely, the door being closed, a charging current flows into the capacitor 30 through the path which includes diode 16 the emitter-base path of transistor 26, resistor 29 and capacitor 30. The charging current turns on transistor 26 which, in turn, causes transistor 23 to also switch on. Upon completion of charging the capacitor 30, however, transistors 26 and hence 23 are turned off. Thus, as in the first embodiment, relay 9 is energized such that closing of relay contacts 9b causes self-holding of the relay. Even if the ignition switch 18 is later turned off, transistors 26 and 23 are maintained in their off states and relay 9 continues its self-holding. However, if a door is opened so as to turn door switch 19 on, a base current flows into transistor 26 through a path which includes diode 10, the emitter base circuit of transistor 26, resistor 29, diode 31 and door switch 19. This current flow switches on transistor 26, while the base of transistor 23 is grounded through diode 25 and door switch 19 such that transistor 23 is maintained in its off state and relay 9 continues its self-holding operation.

Upon turning on of door switch 19 by opening of a door, capacitor 30 discharges through diode 31. Subsequently, if the door is then closed and door switch 19 turned off, a charging current flows into capacitor 30 again, and transistor 26 continues in an on state. Transistor 23 is thus likewise turned on, driving its collector to ground so that transistor 8 is turned off and relay 9 released from its self-holding state. According to this embodiment, therefore, sequential opening and closing of the door causes opening of relay contacts 9b and termination of power availability at output terminal 6.

Figure 4:
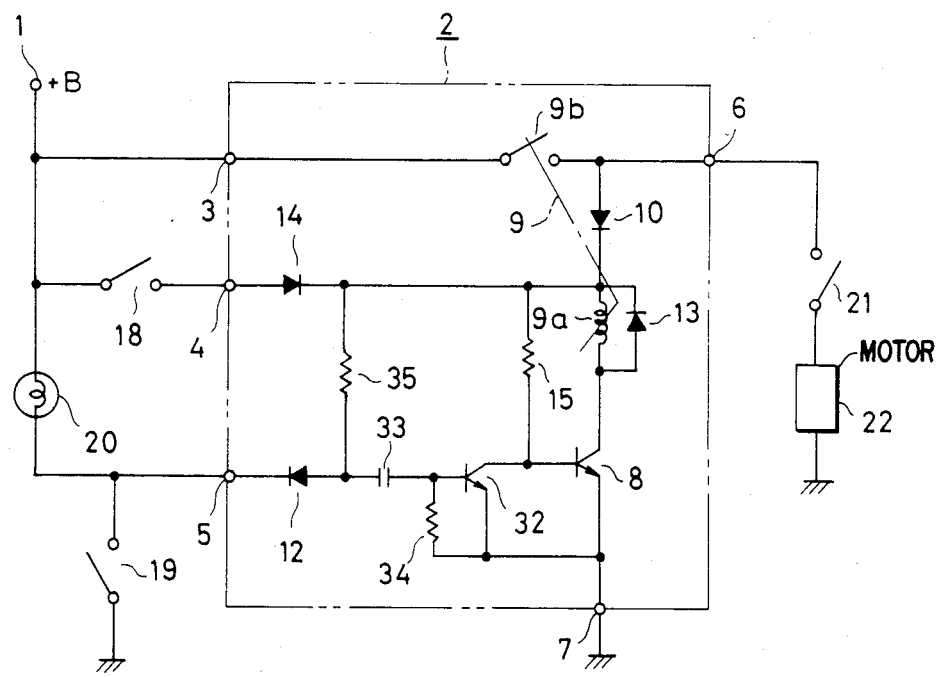
FIG. 4 is a schematic diagram illustrating a fourth embodiment of a power supply circuit for a vehicle in accordance with the present invention.

A fourth embodiment of the present invention is illustrated in FIG. 4. In the drawing, the same reference numerals as found in FIG. 2 are used to designate the same parts, and only those parts different from the FIG. 2 embodiment will be described hereafter.

An NPN transistor 32 has a collector connected to the base of transistor 8, and emitter connected to ground terminal 7, and a base connected to two circuit branches, one branch being a capacitor 33 serially coupled to a capacitor 33 and the anode of diode 12, and the other branch being connected to the emitter of transistor 32 via a resistor 34. A resistor 35 is connected between the cathode of diode 14 and the anode of diode 12.

In this embodiment, if ignition switch 18 is turned on while door switch 19 is in its off state, charging current flows into capacitor 33 through diode 14 and resistor 35 to turn transistor 32 on, while transistor 8 is left in an off state. Upon completion of a charging of capacitor 33, transistor 32 is turned off whereas transistor 8 is turned on, thus, relay 9 is energized and, with the closing of relay contacts 9b, a self-holding state is entered.

Thereafter, if door switch 19 is turned on, after ignition switch 19 has been turned off, such as opening of the vehicle door after the engine has been turned off, transistor 32 is maintained in its off state even though capacitor 33 has discharged through diode 12. Transistor 8 remains in its on state, however, so that relay 9 continues in its self-holding operation and power is thus maintained at output terminal 6. If door switch 19 is then turned off, by closing the door, charging current flows into capacitor 33 to turn transistor 32 on and turn off transistor 8, thus releasing relay 9 from its self-holding state and opening relay contacts 9b. Accordingly, the embodiment of FIG. 4 provides for termination of power at output terminal 6 after ignition switch 18 has been turned off only upon sequential opening and closing of the vehicle door.

In the event ignition switch 18 is maintined continuously in its on state, sequential opening and closing of the vehicle door causes a charging current to flow into capacitor 33 every time door switch 19 is turned off. This turns on transistor 32 and turns off transistor 8 such that relay 9 is caused to return to its initial state temporarily in which relay contacts 9b are open. As transistor 32 is turned off upon completion of charging of capacitor 33, a base current again flows into transistor 8 through ignition switch 18, diode 14 and resistor 15 to thereby turn transistor 8 back on such that relay 9 is energized and closes relay contacts 9b. Thus, the period in which relay contacts 9b are open is very short and does not hinder normal operation of drive motor 22.

Figure 5:
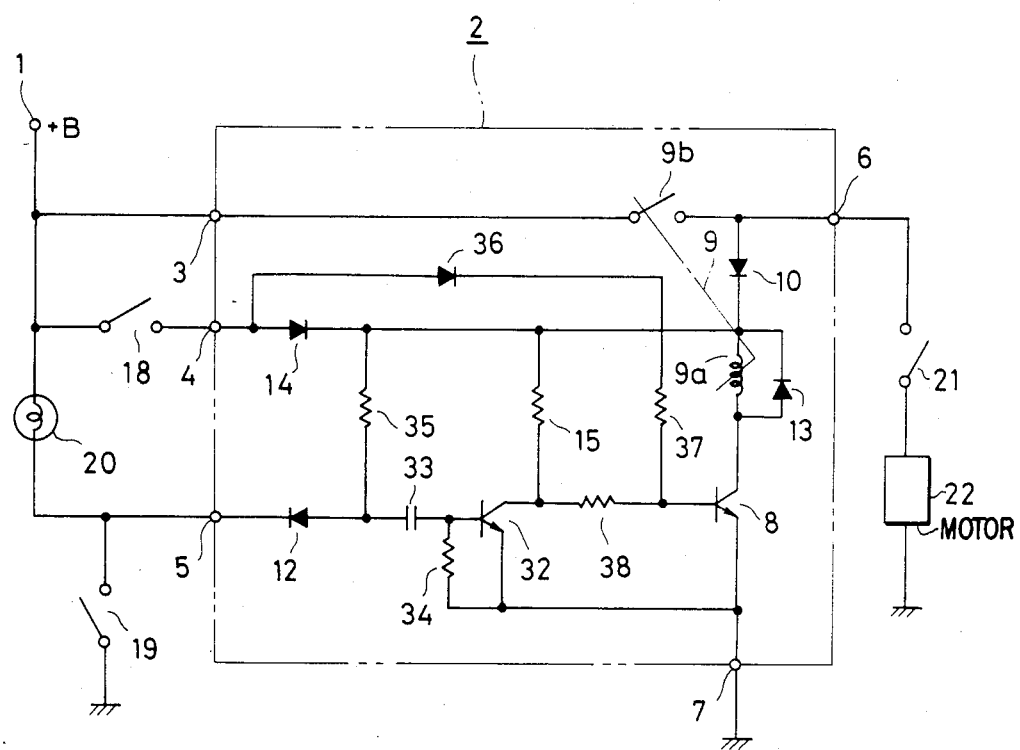
FIG. 5 is a schematic diagram illustrating a fifth embodiment of a power supply circuit for a vehicle in accordance with the present invention.

A fifth embodiment of the present invention is disclosed in FIG. 5 which differs from the embodiment of FIG. 4 only in that a series connection comprising a resistor 37 and a diode 36 is connected between the anode of diode 14 and the base of transistor 8. Further, a resistor 38 is connected between the base of transistor 8 and the collector of transistor 32. Thus, whenever ignition switch 18 is in its on state, relay 9 is continuously energized regardless of the status of door switch 19. In this embodiment, a diode may alternatively be connected in place of resistor 38 and arranged in a forward direction with respect to the base current of transistor 8.

As stated above, lamp 20 can conveniently be placed to illuminate the interior of the vehicle upon opening of any of the vehicle's doors, as detected by closing of switch 19. Alternately, in an embodiment in which only the driver's door is connected to a door switch 19, the lamp will operate only in response to opening and closing of that one door and to no others. Modifications in this arrangement are believed to be apparent from the foregoing and still within the scope of the present invention.

Although the prior discussion principally related to the use of a motor drive 22 for purposes of operating power driven windows, it is to be understood that this drive can also be used to operate any other motor driven accessory, such as a sun roof, electric antenna, or the like.

It will be apparent to those skilled in the art that modifications and variations can be made in the power supply circuit of this invention. The invention in its broader aspects is, therefore, not limited to the specific details representative methods, apparatus and illustrative examples herein shown and described. Thus, it is intended that all matter contained in the foregoing description or shown in the accompanying drawings shall be interpreted as illustrative and not in a limiting sense.

What we claim is:

1. A circuit for a motorized vehicle having an ignition switch connected to a power source, such as a battery, the circuit controlling the application of power from the power source to an electric device, such as a motor for driving an electric window or sun roof, comprising:

a relay having relay contacts and a driving coil, the relay contacts being connected between the power source and the electric device so as to apply power to said device upon energization of said driving coil;

door switch means coupled to the power source for detecting opening of a door of the vehicle; and control means coupled to said ignition switch, to said door switch means and to said driving coil, for continuously energizing said driving coil in direct response to power being applied from the power source by the ignition switch and for de-energizing said driving coil in response to said door switch means detecting opening of a door of the vehicle.

2. The circuit as recited in claim 1, wherein said control means de-energizes said driving coil in response to said switch means only in the absence of power being applied by the ignition switch.

3. The circuit as recited in claim 1, wherein said control means is further coupled to said relay contact for deriving power therefrom upon energization of said driving coil, said control means thus energizing said driving coil in a self-holding manner.

4. The circuit as recited in claim 1, wherein said control means includes a transistor.

5. The circuit as recited in claim 4, wherein said transistor has a base coupled to said ignition switch and to said door switch means, and a collector coupled to said driving coil.

6. The circuit as recited in claim 1, wherein said relay contacts are normally open, and only close in response to energization of said driving coil.

7. The circuit as recited in claim 1, wherein said door switch means comprises a light bulb serially connected between the power supply and said control means, and a door switch for selectively grounding the connection between said light bulb and said control means.

8. The circuit as recited in claim 7, wherein said door switch is open when the vehicle door is closed, and closed when the vehicle door is open.

9. A circuit for a motorized vehicle having an ignition switch connected to a power source, such as a battery, the circuit controlling the application of power from the power source to an electric device, such as a motor for driving an electric window or sun roof, comprising:

a relay having relay contacts and a driving coil, the relay contacts being connected between the power source and the electric device so as to apply power to said device upon energization of said driving coil;

door switch means coupled to the power source for detecting opening of a door of the vehicle; and control means coupled to said ignition switch, to said door switch means and to said driving coil, for continuously energizing said driving coil in direct response to power being applied from the power source by the ignition switch and for de-energizing said driving coil in response to said door switch means detecting sequential opening and closing of a door of the vehicle.

10. The circuit as recited in claim 9, wherein said control means de-energizes said driving coil in response to said switch means only in the absence of power being applied by the ignition switch.

11. The circuit as recited in claim 9, wherein said control means is further coupled to said relay contact for deriving power therefrom upon energization of said driving coil, said control means thus energizing said driving coil in a self-holding manner.

12. The circuit as recited in claim 9, wherein said control means includes a transistor.

13. The circuit as recited in claim 12, wherein said transistor has a base coupled to said ignition switch and to said door switch means, and a collector coupled to said driving coil.

14. The circuit as recited in claim 9, wherein said relay contacts are normally open, and only close in response to energization of said driving coil.

15. The circuit as recited in claim 9, wherein said door switch means comprises a light bulb serially connected between the power supply and said control means, and a door switch for selectively grounding the connection between said light bulb and said control means.

16. The circuit as recited in claim 15, wherein said door switch is open when the vehicle door is closed, and closed when the vehicle door is open.

17. The circuit as recited in claim 9, wherein said control means includes a capacitor for continuing to energize said driving coil after said door switch means has detected opening of the vehicle door.

18. The circuit as recited in claim 17, wherein said control means further includes transistor switching means for discharging said capacitor in response to said door switch means detecting sequential opening and closing of the vehicle door.

* * * * *